United States Patent
Choi et al.

(10) Patent No.: US 11,652,246 B2
(45) Date of Patent: May 16, 2023

(54) BATTERY MODULE AND METHOD OF MANUFACTURING THE SAME

(71) Applicant: SK Innovation Co., Ltd., Seoul (KR)

(72) Inventors: Eun Jeong Choi, Daejeon (KR); Seung Hoon Ju, Daejeon (KR)

(73) Assignee: SK ON CO., LTD., Seoul (KR)

( * ) Notice: Subject to any disclaimer, the term of this patent is extended or adjusted under 35 U.S.C. 154(b) by 48 days.

(21) Appl. No.: 17/181,515

(22) Filed: Feb. 22, 2021

(65) Prior Publication Data

US 2021/0175559 A1    Jun. 10, 2021

Related U.S. Application Data

(63) Continuation of application No. 15/392,738, filed on Dec. 28, 2016, now Pat. No. 10,930,985.

(30) Foreign Application Priority Data

Dec. 29, 2015   (KR) .................. 10-2015-0188089

(51) Int. Cl.
   *H01M 10/613*     (2014.01)
   *H01M 10/6555*    (2014.01)
   *H01M 50/30*      (2021.01)
   *H01M 10/653*     (2014.01)
   *H01M 10/6551*    (2014.01)
   *H01M 10/34*      (2006.01)
   *H01M 10/647*     (2014.01)
   (Continued)

(52) U.S. Cl.
   CPC ....... *H01M 10/613* (2015.04); *H01M 10/345* (2013.01); *H01M 10/653* (2015.04); *H01M 10/6551* (2015.04); *H01M 10/6555* (2015.04);
   *H01M 50/394* (2021.01); *H01M 10/647* (2015.04); *H01M 50/211* (2021.01); *H01M 50/276* (2021.01)

(58) Field of Classification Search
   None
   See application file for complete search history.

(56) References Cited

U.S. PATENT DOCUMENTS

| | | | |
|---|---|---|---|
| 10,930,985 B2 * | 2/2021 | Choi | ............... H01M 10/613 |
| 2007/0178377 A1 | 8/2007 | Kim et al. | |
| 2013/0122346 A1 | 5/2013 | Jiang et al. | |

(Continued)

FOREIGN PATENT DOCUMENTS

| | | |
|---|---|---|
| CN | 2599761 Y | 1/2004 |
| CN | 1795572 A | 6/2006 |

(Continued)

OTHER PUBLICATIONS

Larsson (EP 2916366) (a raw machine translation) (Detailed Description) (Sep. 9, 2015) (Year: 2015).*

(Continued)

*Primary Examiner* — Carmen V Lyles-Irving
(74) *Attorney, Agent, or Firm* — IP & T Group LLP

(57) ABSTRACT

A battery module and a method of manufacturing the same are provided. The battery module includes a case providing an internal space, a plurality of battery cells disposed in the internal space of the case, and at least one cooling unit interposed between the battery cells to be in surface contact with the battery cells and dissipating heat generated by the battery cells externally.

12 Claims, 8 Drawing Sheets

(51) Int. Cl.
*H01M 50/276* (2021.01)
*H01M 50/211* (2021.01)

(56) References Cited

U.S. PATENT DOCUMENTS

| | | | | |
|---|---|---|---|---|
| 2014/0093765 | A1* | 4/2014 | Kusunoki | H01M 50/227 |
| | | | | 429/163 |
| 2015/0221996 | A1* | 8/2015 | Jin | H01M 10/613 |
| | | | | 429/120 |
| 2018/0183119 | A1 | 6/2018 | Ju et al. | |

FOREIGN PATENT DOCUMENTS

| | | |
|---|---|---|
| CN | 101669247 A | 3/2010 |
| CN | 201936935 U | 8/2011 |
| CN | 102227846 A | 10/2011 |
| CN | 102237546 A | 11/2011 |
| CN | 202523812 U | 11/2012 |
| CN | 103703585 A | 4/2014 |
| CN | 103855331 A | 6/2014 |
| CN | 103943913 A | 7/2014 |
| CN | 203839482 U | 9/2014 |
| CN | 203871393 U | 10/2014 |
| CN | 104137294 A | 11/2014 |
| CN | 104377320 A | 2/2015 |
| CN | 204144386 U | 2/2015 |
| CN | 104813535 A | 7/2015 |
| CN | 105051933 A | 11/2015 |
| DE | 10 2011 053 940 A1 | 4/2012 |
| EP | 2 916 366 A1 | 9/2015 |
| KR | 10-2006-0063175 A | 6/2006 |
| KR | 10-2009-0032006 A | 3/2009 |
| KR | 10-2011-0130277 A | 12/2011 |
| KR | 10-2012-0051237 A | 5/2012 |
| KR | 10-2014-0015859 A | 2/2014 |
| KR | 10-2015-0055255 A | 5/2015 |

OTHER PUBLICATIONS

Wu (DE 102011053940) (a raw machine translation) (Apr. 26, 2012) (Year: 2012).*
Hong et al. (KR 2011-0130277) (a raw machine translation) (Detailed Description) (Dec. 5, 2011) (Year: 2011).*
Hong et al. (KR 2011-0130277) (a raw machine translation) (Drawings) (Dec. 5, 2011) (Year: 2011).*
Office Action issued by the China Intellectual Property Office dated May 17, 2021.

* cited by examiner

BATTERY MODULE AND METHOD OF MANUFACTURING THE SAME

CROSS-REFERENCE TO RELATED APPLICATION(S)

This application is a continuation of U.S. patent application Ser. No. 15/392,738 filed on Dec. 28, 2016, which claims benefits of priority of Korean Patent Application No. 10-2015-0188089 filed on Dec. 29, 2015. The disclosure of each of the foregoing application is incorporated herein by reference in its entirety.

BACKGROUND

1. Field

The present disclosure relates to a battery module and a method of manufacturing the same.

2. Description of Related Art

Unlike primary batteries, secondary batteries may be charged and discharged with electrical energy. Thus, secondary batteries may be applied to various fields, for example, in the arts of digital cameras, mobile phones, notebook computers, and hybrid vehicles. Examples of secondary batteries may include a nickel-cadmium battery, a nickel-metal hydride battery, a nickel-hydrogen battery, a lithium secondary battery, and the like.

Among such secondary batteries, research into lithium secondary batteries having a high energy density and high discharge voltages is being actively undertaken. Recently, lithium secondary batteries have been manufactured as flexible pouch type battery cells, and a plurality of such flexible pouch type battery cells may be connected to one another to be configured and used in module form.

Efficiency and performance of such battery modules greatly depends on temperature. For example, when a battery is discharged at a relatively high temperature, a problem in which the life of a battery module may be significantly reduced may occur.

SUMMARY

An aspect of the present disclosure is to provide a battery module of which a volume may be significantly reduced while having a further efficient cooling structure, and a method of manufacturing the same.

According to an aspect of the present disclosure, a battery module includes a case providing an internal space, a plurality of battery cells disposed in the internal space of the case, and at least one cooling unit interposed between the battery cells to be in surface contact with the battery cells and dissipating heat generated by the battery cells externally.

The at least one cooling unit may include a cooling plate disposed in such a manner that two surfaces of the cooling plate are in surface contact with the battery cells, and a heat dissipating member connected to the cooling plate and disposed externally of the case.

The case may include a main frame having two open sides, and sides covers coupled to the two open sides of the main frame to form the internal space.

The main frame may include two buffer plates disposed in a central portion of the main frame, and the two buffer plates may be spaced apart from each other by a predetermined distance.

The two buffer plates may include protrusions protruding in a single direction, and may be disposed in such a manner that the protrusions contact each other.

The battery module may further include a plurality of cell guides disposed to correspond to positions of surface contact portions between the battery cells and to correspond to contours of the battery cells.

The plurality of cell guides may have a shape formed by bending a central portion of a linear member in such a manner that two ends of the linear member are perpendicular to each other to contact corners of the battery cell.

The plurality of cell guides may be disposed on the buffer plates and the cooling plate of the at least cooling unit disposed between the battery cells.

All of the main frame and the side covers may be formed of a resin material, and may be bonded to each other by laser welding.

The case may further include at least one sealing cover coupled to a coupling portion between the main frame and the side covers in padded form, to seal the internal space.

A portion of the sealing cover, contacting the main frame and the side covers, may be formed of a material having elasticity.

The sealing cover may include a gas outlet externally discharging gas generated in the case.

Each of the side covers may include a cover plate in surface contact with a battery cover, and a side frame disposed along a periphery of the cover plate and bonded to the main frame.

The cover plate may be formed of a metal, and may include a protrusion protruding inwardly in a single direction.

The battery module may further include an elastic member interposed between the heat dissipating member and the case.

According to an aspect of the present disclosure, a battery module includes a case providing an internal space, and a plurality of battery cells disposed in the internal space of the case. The case includes a main frame of which two sides are open, side covers coupled to the two open sides of the main frame to form the internal space, and at least one sealing cover connected to a coupling portion between the main frame and the side covers in padded form, to seal the internal space.

According to an aspect of the present disclosure, a method of manufacturing a battery module includes coupling inner battery cells to two open sides of a main frame including a buffer plate therein, respectively; coupling cooling units to outer sides of the inner battery cells, respectively; coupling outer battery cells to outer sides of the cooling units, respectively; and bonding side covers to outer sides of the outer battery cells, respectively.

The coupling side covers may include coupling the main frame to the side covers in such a manner that protrusions formed on the main frame are inserted in grooves formed in the side covers, and bonding the side covers to the main frame by irradiating a laser beam onto the protrusions.

The method may further include sealing an internal space in which the battery cells are disposed, by coupling at least one sealing cover to a coupling portion between the main frame and the side covers, to seal the internal space in which the battery cells are disposed.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
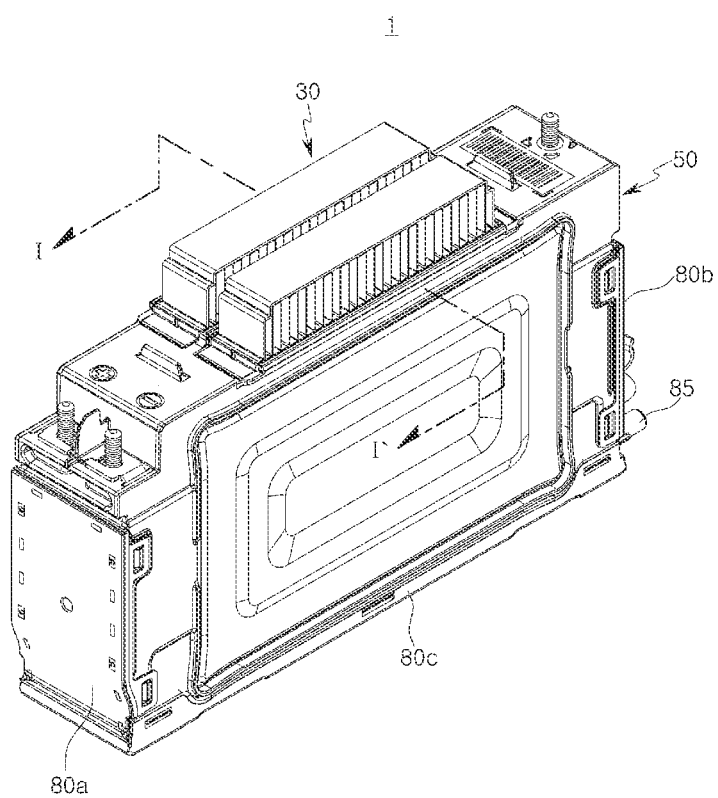
FIG. 1 is a schematic perspective view of a battery module according to an exemplary embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Figure 2:
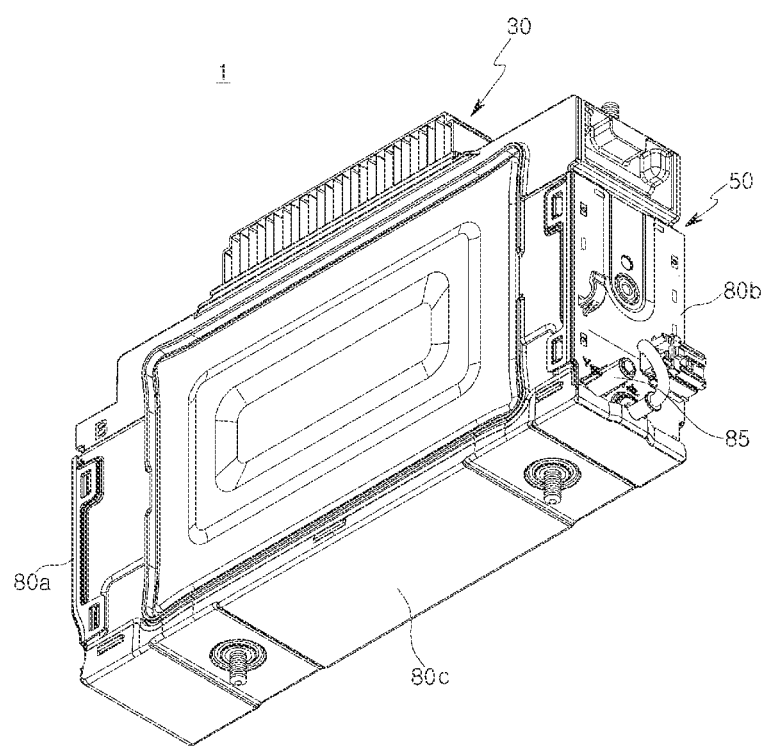
FIG. 2 is a rear perspective view of the battery module illustrated in FIG. 1.
Figure 3:
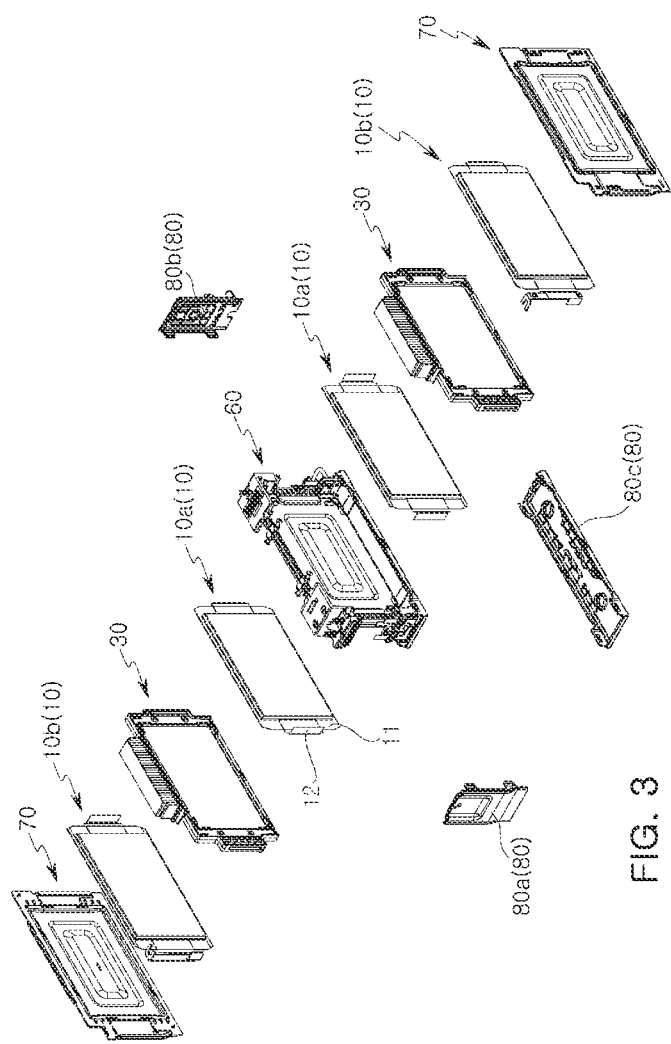
FIG. 3 is an exploded perspective view of the battery module illustrated in FIG. 1.

Referring to FIGS. 1 to 3, a battery module 1 according to an exemplary embodiment may include a plurality of battery cells 10, a case 50, housing the plurality of battery cells 10 therein, and a cooling unit 30 cooling the battery cells 10.

The battery cells 10 may include a secondary battery, such as a rechargeable lithium secondary battery, a nickel-hydrogen secondary battery, or the like. For example, a nickel-hydrogen secondary battery may be a secondary battery in which nickel is used for formation of a positive pole, a hydrogen storage alloy is used for formation of a negative pole, and an aqueous alkaline solution is used as an electrolyte. Thus, since the nickel-hydrogen secondary battery has a relatively high capacity per unit volume, the nickel-hydrogen secondary battery may be used in various fields, such as energy storage use, as well as being used as an energy source in an electric vehicle (EV), a hybrid vehicle (HEV), or the like.

The battery cells 10 according to the exemplary embodiment may include electrode tabs 12 protruding toward two sides of a cell case 11. The battery cells 10 may have, for example, a pouch type structure, but are not limited thereto.

The cell case 11 may be formed, for example, by performing an insulation treatment on a surface of a metal layer formed of aluminum. In the insulation treatment, a modified polypropylene, such as cast polypropylene (CPP), a polymer resin, may be applied, as a thermosetting layer, to the surface of the metal layer, and a resin material such as nylon or polyethylene terephthalate (PET) may be formed on an outer surface thereof.

The electrode tab 12 may include a positive electrode tab and a negative electrode tab, and the positive electrode tab and the negative electrode tab may be disposed in a structure in which the positive electrode tab and the negative electrode tab protrude from two sides of the cell case 11 to be spaced apart from each other. The positive electrode tab and the negative electrode tab may be connected to an electrode assembly (not shown) disposed inside the cell case 11.

The positive and negative electrode tabs may be formed of a metal having a thin plate shape. For example, the positive electrode tab may be formed of an aluminum (Al) material, and the negative electrode tab may be formed of a copper (Cu) material, but are not limited thereto.

The plurality of battery cells 10 may be arranged in such a manner that the electrode tabs 12, of the respective battery cells 10, are disposed in the same direction. The plurality of battery cells 10 may be electrically connected to each other through the electrode tabs 12 of the respective battery cells 10.

The case 50 may include a main frame 60 and side covers 70.

Figure 4:
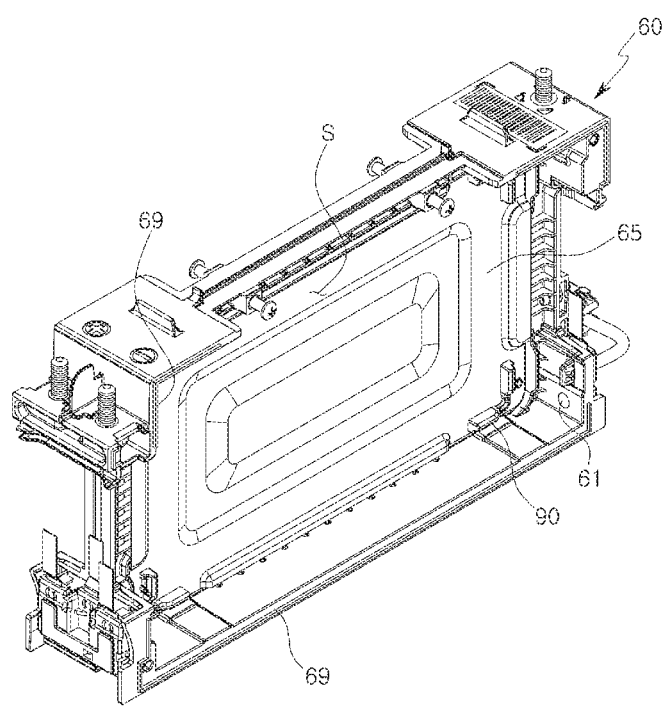
FIG. 4 is an enlarged perspective view of a main frame illustrated in FIG. 3.
Figure 5:
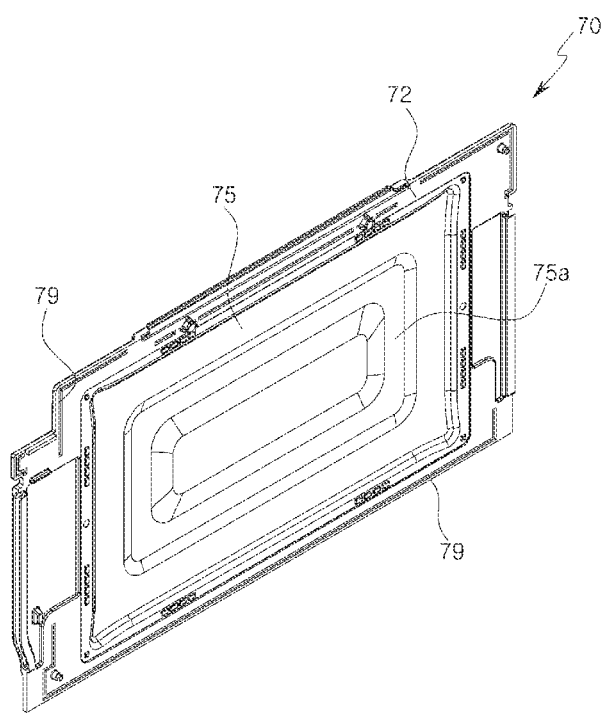
FIG. 5 is an enlarged perspective view of a side cover illustrated in FIG. 3.

FIG. 4 is an enlarged perspective view of the main frame illustrated in FIG. 3, while FIG. 5 is an enlarged perspective view of the side cover illustrated in FIG. 3.

Referring to FIGS. 4 and 5, the main frame 60 may be disposed in a central portion of the battery module 1 to form a skeleton of the battery module 1.

The main frame 60 may have a size allowing the battery cell 10 to be accommodated therein, by corresponding to a size of the battery cell 10, and may be configured in a manner in which it surrounds the battery cell 10 along a circumference thereof.

Thus, the main frame 60 may be formed to have a quadrangular ring shape of which two sides are open.

Further, a plurality of battery cells 10 may be accommodated in an internal space S of the main frame 60. Thus, a thickness of the main frame 60 may define an overall thickness of the battery module 1.

A buffer plate 65 may be disposed in the main frame 60.

Figure 7:
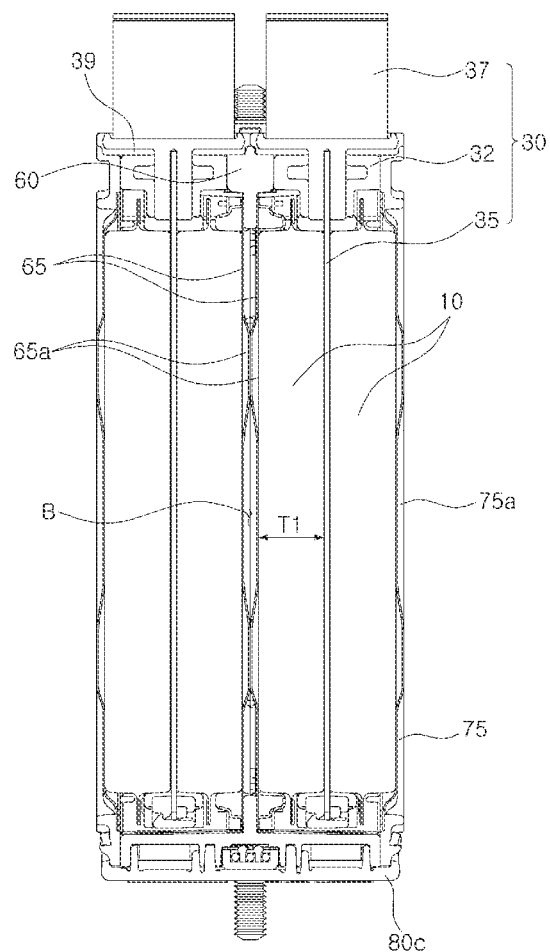
FIG. 7 is a schematic cross-sectional view illustrating a cross section taken along line I-I' illustrated in FIG. 1.

FIG. 7 is a schematic cross-sectional view taken along line I-I' of FIG. 1.

Further, with reference to FIG. 7, the buffer plate 65 may be disposed in such a manner that the buffer plate entirely blocks the internal space S of the main frame 60 in a central portion thereof, and two buffer plates 65 may be disposed to be spaced apart from each other in parallel.

The buffer plate 65 may be formed of a relatively thin, rigid material. In an exemplary embodiment, a metal plate material may be used. The buffer plate 65 may be disposed in such a manner that an outer surface of the buffer plate may contact the battery cell 10. In addition, protruding portions 65a partially bent and protruding in a single direction may be formed inside the buffer plate 65.

As illustrated in FIG. 7, the protruding portions 65a protruding from two buffer plates 65 may be arranged to be in contact with each other. Thus, the two buffer plates 65 may maintain a spacing distance therebetween equal to that of protruding distances of the protruding portions 65a.

The buffer plate 65 may be provided for expansion of the battery cell 10. For example, in the case of a general battery cell, the battery cell may often expand during use. In this case, if there is no space in the case 50, the case 50 may be deformed and damaged by the expansion of the battery cell.

Thus, in the case of the battery module 1 according to the exemplary embodiment, two buffer plates 65 may be used to form a buffer space B in a central portion of the main frame 60.

Thus, in the case in which the battery cell 10 expands, the buffer plates 65 may be pressed and the buffer space B may be reduced by an amount equal to the amount by which the battery cell 10 has expanded. Thus, even when the battery cell 10 expands, an appearance of the case 50 or the battery module 1 may not be deformed or damaged.

A protruding distance from the buffer plate 65 may be set to 10% of a thickness T1 of the battery cell 10. Thus, a width of the buffer space B may be formed to correspond to 20% of the thickness T1 of the battery cell 10, but is not limited thereto.

The side covers 70 may be coupled to the open sides of the main frame 60. Thus, the side covers 70 may be provided as two covers to be coupled to two sides of the main frame 60, respectively.

In an example, when the side covers 70 are coupled to the main frame 60, the internal space S may be formed between the side covers 70 and in the main frame 60, and the space S may be used as a space in which the battery cell 10 and the cooling unit 30 to be described later may be disposed.

The side covers 70 may be in surface contact with the battery cells 10 to uniformly distribute pressure applied externally, to overall surfaces of the battery cells 10. For example, the side covers 70 may serve as cushioning members protecting the battery cells 10 while alleviating external impacts.

The side covers 70 may be formed to have a generally-flat plate shape, and may respectively be configured to include a side plate 75 and a side frame 72.

The side plate 75 may be disposed to be in surface contact with the battery cell 10, and the side frame 72 may be disposed along a periphery of the side plate 75. Thus, the side frame 72 may be formed as a hollow quadrangular frame, and the side plate 75 may be insertedly disposed inside the side frame 72.

The side plate 75 may be formed of a metal having relatively high thermal conductivity, and may include a protrusion 75a protruding inwardly therefrom. As the protrusion 75a is formed, for example, when the battery cell 10 expands, the side plate 75 may be deformed while corresponding to the expanded shape of the battery cell 10.

The side frame 72 may be formed of an insulating material such as a resin, or may be integrally joined with the side plate 75 through a separate fastening member such as a screw or a rivet.

In the case of the battery module 1 according to the exemplary embodiment, the side covers 70 may be joined to the main frame 60 by laser welding. To this end, the side frame 72 may be formed of a transparent material through which a laser beam may pass.

Thus, during a bonding process, a laser beam may pass through the side frame 72 and may be irradiated onto a contact surface between the side frame 72 and the main frame 60. Thus, plastic welding may be performed between the side frame 72 and the main frame 60.

The cooling unit 30 may be disposed between the battery cells 10 to discharge heat generated by the battery cells 10 externally.

Figure 6:
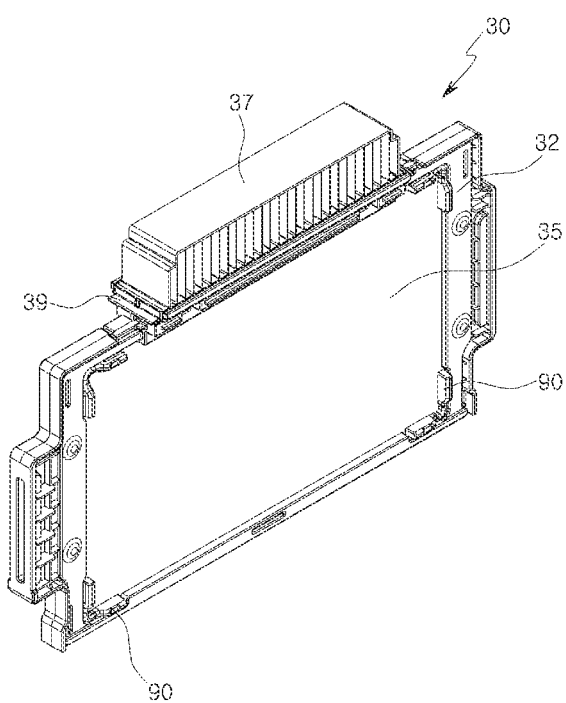
FIG. 6 is an enlarged perspective view of a cooling unit illustrated in FIG. 3.

FIG. 6 is an enlarged perspective view of the cooling unit illustrated in FIG. 3.

Referring to FIGS. 3 and 6, the cooling unit 30 according to the exemplary embodiment may include a cooling plate 35, a cooling frame 32, and a heat dissipating member 37.

The cooling plate 35 may be disposed to be in contact with the battery cell 10, and may be disposed inside the cooling frame 32.

The cooling plate 35 may be formed of a metal having relatively high thermal conductivity, and may be formed as a flat surface without protruding regions to secure a significant contact area thereof with the battery cells 10.

The cooling frame 32 may be disposed along a periphery of the cooling plate 35 similarly to a manner of the side frame 72 described above. For example, the cooling frame 32 may be formed as a hollow quadrangular frame, and the cooling plate 35 may be disposed inside the side frame 72.

The cooling frame 32 may be formed of an insulating material such as a resin, or may be integrally joined to the cooling plate 35 through a separate fastening member such as a screw or a rivet.

The heat dissipating member 37 may be disposed on one side of the cooling frame 32, and may be connected to the cooling plate 35 in such a manner in which at least a portion thereof may be in contact with the cooling plate 35. Thus, heat transferred to the cooling plate 35 from the battery cells 10 may be dissipated externally through the heat dissipating member 37.

The heat dissipating member 37 may be formed using a metal member having a relatively large surface area to effectively emit heat. In the exemplary embodiment, the heat dissipating member 37 may be formed by bending a metal plate in zigzag form, but is not limited thereto. Any form capable of effectively dissipating heat externally may be configured variously. For example, as the heat dissipating member 37, a general heat sink may be used.

An elastic member 39 may also be interposed between the heat dissipating member 37 and the main frame 60 to seal the internal space S of the case 50. The elastic member 39 may be formed of a material, such as rubber or silicon, having elasticity and sealing a space between the heat dissipating member 37 and the main frame 60.

In the exemplary embodiment, the cooling unit 30 may be insertedly disposed into two sides of the main frame 60, respectively. In addition, the battery cells 10 may be disposed on two sides of the cooling unit 30, based on the cooling unit 30, respectively.

Thus, since two battery cells 10 are disposed on two sides of each of two cooling units 30, respectively, the battery module 1 according to the exemplary embodiment may include a total of four battery cells 10.

However, the configurations according to exemplary embodiments are not limited thereto. For example, the battery module 1 according to an exemplary embodiment may include two or more cooling units 30, and may include a relatively large number of battery cells 10 corresponding thereto. In this case, the main frame 60 may be provided as a plurality of main frames as needed.

In addition, in the case of the battery module 1 according to the exemplary embodiment, a plurality of cell guides 90 may be disposed on the buffer plate 65 or the cooling plate 35.

The cell guides 90 may be members defining a position of the battery cell 10, and may be disposed on a surface of the buffer plate 65 or the cooling plate 35, contacting the battery cell 10, to correspond to a contour of the battery cell. In the exemplary embodiment, the cell guides 90 may be respectively disposed on portions of the buffer plate 65 or the cooling plate 35, corresponding to corners of the battery cells 10.

As the cell guides 90 are provided, a coupling position of the battery cell 10 may be definite, and thus the battery cell 10 may be easily coupled to the main frame 60. Further, since the battery cell 10 is fixed such that the battery cell 10 may not be shaken during a welding or assembling process, the battery cell 10 may be prevented from being damaged or deformed during a manufacturing process thereof.

The cell guides 90 may be formed of a material, such as rubber, having elasticity, for example, a thermoplastic elastomer (TPE), but are not limited thereto.

The cell guides 90 according to the exemplary embodiment may be formed to have a form formed by bending a linear member based on a center thereof in such a manner that two ends of the linear member are perpendicular to each other while being in different directions. For example, the cell guides 90 may have a '⌐'shape, in which a portion thereof is bent vertically.

For example, if the cell guides 90 are formed to correspond to an overall contour of the battery cell 10, the battery cell 10 may be stably fixed, but a problem in which a weight of the battery module 1 is increased may occur.

Thus, the battery module 1 according to the exemplary embodiment may provide the cell guides 90 capable of fixing the battery cells 10 with significant stability while significantly reducing a size of the cell guides 90.

In the case of the cell guides 90 according to the exemplary embodiment, a length of a portion of each thereof supporting a long side of the battery cell 10 may be a length corresponding to one-fifteenth (⅕) of a length of the long side of the battery cell 10. Further, a length of a portion of each of the cell guides 90, supporting a short side of the battery cell 10, may be a length corresponding to ⅑ (one-ninth) of a length of the short side of the battery cell 10.

Thus, the battery cell 10 may be stably supported while the size of the cell guides 90 is significantly reduced. However, exemplary embodiments are not limited thereto and the lengths of the cell guides 90 may be changed according to a shape and a size of the battery cell 10.

The case 50 of the battery module 1 according to the exemplary embodiment may include at least one sealing cover 80 connected to the main frame 60 and the side covers 70 in such a manner that the main frame 60 and the side covers 70 are fixed to each other.

The sealing cover 80 may be connected to the main frame 60 and the side covers 70 in such a manner that the sealing cover 80 is padded by a coupling portion between the main frame 60 and the side covers 70, to thus seal the internal space S of the case 50.

The sealing cover 80 may be respectively coupled to three surfaces of four sides of the main frame, on which the heat dissipating member 37 is not disposed.

In detail, the sealing cover 80 according to the exemplary embodiment may include first and second sealing covers 80a and 80b disposed on front and rear surfaces of the main frame 60, respectively, and a third sealing cover 80c disposed on a lower surface of the main frame 60. In this case, the lower surface may indicate a surface opposing the surface of the main frame 60 on which the heat dissipating member 37 is disposed.

In order to seal the internal space S in which the battery cell 10 is accommodated, at least a portion or the entirety of the sealing cover 80 may be formed of a material having elasticity.

Figure 8:
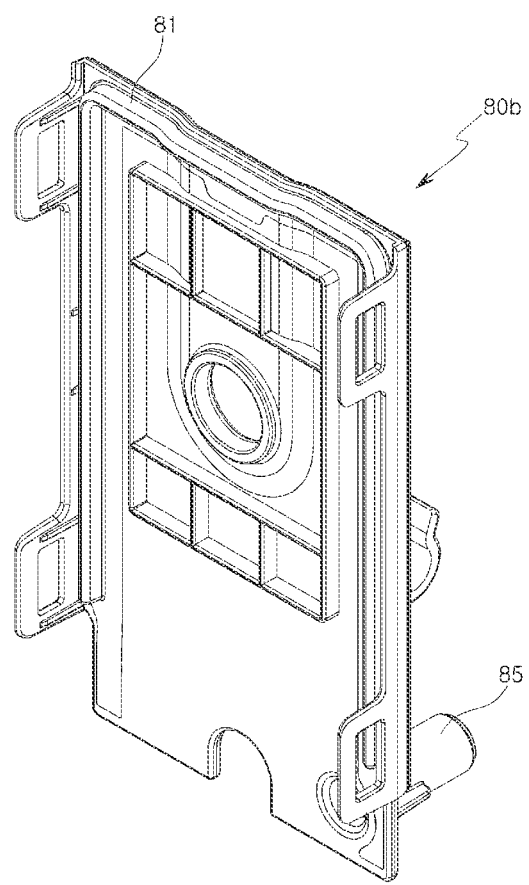
FIG. 8 is an enlarged perspective view of a second sealing cover illustrated in FIG. 3.

FIG. 8 is an enlarged perspective view of the second sealing cover illustrated in FIG. 3.

Referring to FIG. 8, in the exemplary embodiment, the entirety of the second sealing cover 80b may be formed of a resin material, and only a portion thereof in contact with the main frame 60 may be formed as an elastic portion 81. In this case, the elastic portion 81 may be formed of a material, such as rubber or silicone, having elasticity and providing sealing force when contacting the main frame 60.

On the other hand, in the case of an elastic portion 81 of the first sealing cover 80a, the elastic portion 81 of the first sealing cover 80a may be configured in the same manner as the second sealing cover 80b. Thus, a detailed description of the first sealing cover 80a will be omitted.

The first and second sealing covers 80a and 80b may be manufactured through a double injection method. For example, a body portion formed of a resin material may first be formed using an injection method, and then the elastic portion 81 may be formed by injecting the body portion into a mold.

According to the exemplary embodiment, the entirety of the third sealing cover 80c may be formed of a rubber material, but is not limited thereto. For example, only a portion of the third sealing cover 80c may be formed as an elastic portion in a manner similar to that of the first and second sealing covers 80a and 80b. Further, materials of the first and second sealing covers 80a and 80b may be variously changed, and for example, both of the first and second sealing covers 80a and 80b may be formed of a rubber material.

In the case of the sealing cover 80 as described above, the elastic portion thereof may seal the internal space S while contacting the main frame 60 or the side covers 70. To this end, the sealing cover 80 may be insertedly fitted to the main frame 60 and the side frame 72, but is not limited thereto.

On the other hand, in portions of the battery cell 10 not coupled to the sealing cover 80, the side covers 70 may be firmly bonded to the main frame 60 by laser welding as described above. Thus, a separate sealing cover 80 may not be required.

In addition, the second sealing cover 80b according to the exemplary embodiment may include a gas outlet 85.

The gas outlet 85 may be disposed at a lower end of the second sealing cover 80b. The gas outlet 85 may be provided to allow gas from the battery cells 10 to be discharged externally.

Since gas flowing from the battery cells 10 is heavier than air, the gas outlet 85 may be positioned in a lower portion of the internal space. Thus, the gas outlet 85 may be disposed at the lower end of the second sealing cover 80b to be connected to a lower portion of the internal space S.

As an inside of the case is formed as a closed space and the gas outlet 85 is provided, gas from the battery cells 10 may be discharged externally, only through the gas outlet 85. Thus, gas may be prevented from arbitrarily flowing externally, and a gas discharge position may be limited to a specific position.

At least one through hole 61 may be formed in the main frame 60 in such a manner that gas in the internal space of the case may smoothly flow into the gas outlet.

The through hole 61 may be disposed adjacently to the gas outlet 85, and thus gas generated in an accommodation space may be smoothly discharged externally through the through hole 61 and the gas outlet 85.

In the case of the battery module 1 according to the exemplary embodiment as described above, the cooling plate 35 may be disposed between the battery cells 10, and the cooling plate 35 may be connected to the heat dissipating member 37 exposed externally.

Thus, heat generated in the battery cells 10 may be dissipated using an indirect cooling method in which heat is transferred to the heat dissipating member 37 to then be dissipated.

In the case of the related art, since a flow path through which a coolant between the battery cells 10 may flow is arranged, a problem in which the volume of the entirety of the battery module 1 is increased may occur. However, in the case of the exemplary embodiment, since only a relatively thin cooling plate 35 is interposed between the battery cells 10, an interval between the battery cells 10 may be significantly reduced, and thus an overall volume of the battery module 1 may be reduced.

In addition, since heat is dissipated externally through the heat dissipating member 37 exposed externally, heat of the battery cells 10 may be effectively dissipated.

In addition, the battery module 1 according to the exemplary embodiment may close the internal space S using laser welding and the sealing cover 80. Thus, noxious gas flowing from the battery cells 10 may be prevented from being discharged to the outside of the case 50, and may only be discharged to the outside through the gas outlet 85 formed in the sealing cover 80.

Thus, a pipe or the like may be connected to the gas outlet 85 to allow exhaust gas to be discharged only to a specific position. Thus, leakage of noxious gas may be prevented.

Further, since the internal space is completely sealed, external hot air may be prevented from flowing into the internal space S and thus, a reduction in cooling performance may be prevented.

Next, a method of manufacturing the battery module according to the exemplary embodiment will be described.

Referring to FIG. 3, battery cells 10a (hereinafter, referred to as inner battery cells) may be coupled to two open sides of a main frame 60, respectively. In this case, the inner battery cells 10a may be coupled to a buffer plate 65 disposed inside the main frame 60 while being in surface contact therewith.

Subsequently, cooling units 30 may be coupled to outer sides of the inner battery cells 10a, respectively. In this process, cooling plates 35 of the cooling units 30 may be disposed to be in surface contact with the inner battery cells 10a, respectively, and heat dissipating members 37 may be disposed to be exposed to the outside of the main frame 60. In addition, an elastic member 39 may be interposed between the heat dissipating member 37 and the main frame 60.

Then, battery cells 10b (hereinafter, referred to as outer battery cells) may be coupled to outer sides of the cooling units 30, respectively. In this case, the outer battery cells 10b may be disposed to be in surface contact with the cooling plates 35, respectively.

Next, side covers 70 may be coupled to outer sides of the outer battery cells 10b, respectively.

In the process in which the side covers 70 are coupled to the outer battery cells 10b, a process of coupling a side frame 72 and the main frame 60 to each other in such a manner that joining protrusions 69 (see FIG. 4) formed on the main frame 60 are inserted into joining grooves 79 see FIG. 5) formed in the side frame 72 may be performed.

The joining protrusions 69 according to the exemplary embodiment may protrude to be longer than a depth of each of the joining grooves 79. Thus, in an example, when the side covers 70 and the main frame 60 are coupled to each other, the side covers 70 and the main frame 60 may not be tightly joined to each other, but may be coupled to each other in a slightly separated state.

Subsequently, a laser beam may be irradiated onto the joining protrusions 69 to allow the jointing protrusions 69 to be bonded to the side covers 70 and the main frame 60. In this process, a portion of an end of a respective joining protrusion 69 may be melted. Thus, in this state, when the side covers 70 and the main frame 60 are pressed to be adhered to each other, the melted portion may be squashed while allowing the side covers 70 and the main frame 60 to be tightly adhered to each other. This state may be maintained, and thus the side covers 70 and the main frame 60 may be joined to each other.

As described above, as the joining protrusion 69 is formed to be longer than a depth of the joining groove 79, the side covers 70 and the main frame 60 may be tightly joined to each other only when the side covers 70 and the main frame 60 are correctly joined to each other. For example, in the case in which the joining therebetween is not correct, a portion corresponding thereto may have a slight gap to be maintained by the joining protrusion 69. Thus, whether or not the joining is correct may be easily confirmed.

Then, a sealing cover 80 may be joined to a coupling portion between the main frame 60 and the side covers 70. An internal space S in which the battery cells 10 are disposed may be completely sealed.

In the method of manufacturing a battery module having a structure such as detailed above according to the exemplary embodiment, battery cells and cooling units may be alternately coupled to each other while being paired on two sides of the main frame, based on the main frame. Thus, tolerance may be reduced and assembly precision may be increased, as compared with a method of stacking battery cells in a vertical direction. Further, a manufacturing process may be facilitated.

As set forth above, according to an exemplary embodiment, a battery module may use an indirect cooling method in which a cooling plate is disposed between battery cells and heat is dissipated externally through an externally-exposed heat dissipating member. Thus, heat of battery cells may be effectively dissipated while significantly reducing the volume of a battery module.

While example embodiments have been shown and described above, it will be apparent to those skilled in the art that modifications and variations could be made without departing from the scope of the present disclosure as defined by the appended claims.

What is claimed is:

1. A battery module comprising:
a case providing an internal space;
a plurality of battery cells disposed in the internal space of the case; and
at least one cooling unit interposed between the plurality of battery cells to be in surface contact with the plurality of battery cells and dissipating heat generated by the plurality of battery cells,
wherein the case comprises:
a main frame having two open sides; and
side covers coupled to the two open sides of the main frame,
wherein the main frame includes a joining protrusion, and each of the side covers includes a joining groove into which the joining protrusion is inserted,
the joining protrusion is formed to protrude further than the depth of the joining groove, and
the main frame is adhered to the joining groove by melting the end of the joining protrusion,
wherein the main frame comprises two buffer plates positioned within the main frame, and the two buffer plates are spaced apart from each other by a predetermined distance,
wherein each of the two buffer plates comprises a partially bent protrusion, and
wherein the partially bent protrusion of a first buffer plate of the two buffer plates contacts the partially bent protrusion of a second buffer plate of the two buffer plates to provide a buffer space between the plurality of battery cells to allow for expansion of the plurality of battery cells.

2. The battery module of claim 1, wherein the at least one cooling unit comprises:
a cooling plate disposed in such a manner that two surfaces of the cooling plate are in surface contact with the plurality of battery cells; and
a heat dissipating member coupled to the cooling plate and exposed outwardly of the main frame.

3. The battery module of claim 1, further comprising at least one cell guide disposed to correspond to contours of the plurality of battery cells.

4. The battery module of claim 3, wherein the at least one cell guide has a shape formed by bending a central portion of a linear member in such a manner that two ends of the linear member are perpendicular to each other.

5. The battery module of claim 3, wherein the at least one cell guide is disposed on the two buffer plates or on a cooling plate disposed in the at least one cooling unit.

6. The battery module of claim 1, wherein the main frame and the side covers are formed of a resin material, and are bonded to each other by laser welding.

7. The battery module of claim 1, wherein the case further comprises at least one sealing cover coupled to a coupling portion between the main frame and the side covers to seal the internal space.

8. The battery module of claim 7, wherein a portion of the at least one sealing cover is formed of a material having elasticity.

9. The battery module of claim 7, wherein the at least one sealing cover comprises a gas outlet to allow a gas from the plurality of battery cells to be discharged externally.

10. The battery module of claim 1, wherein each of the side covers comprises:
a side plate disposed to be in surface contact with the plurality of battery cells; and
a side frame disposed along a periphery of the side plate and bonded to the main frame.

11. The battery module of claim 10, wherein the side plate is formed of a metal, and comprises a protrusion protruding inwardly.

12. The battery module of claim 2, further comprising an elastic member interposed between the heat dissipating member and the main frame.

* * * * *